A. ROBERTS.
METHOD OF PREHEATING.
APPLICATION FILED SEPT. 15, 1916. RENEWED OCT. 23, 1918.

1,304,908.

Patented May 27, 1919.
3 SHEETS—SHEET 1.

Witness: Harry S. Gaither

Inventor: Arthur Roberts
by Bann Bonn, Attys

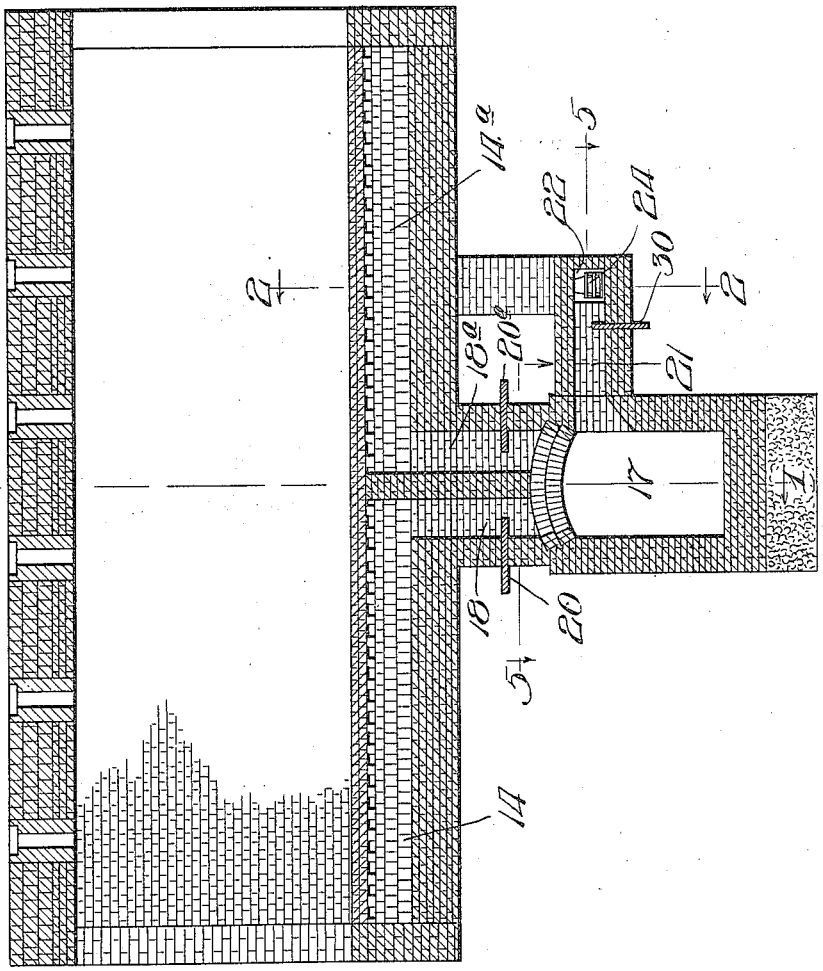

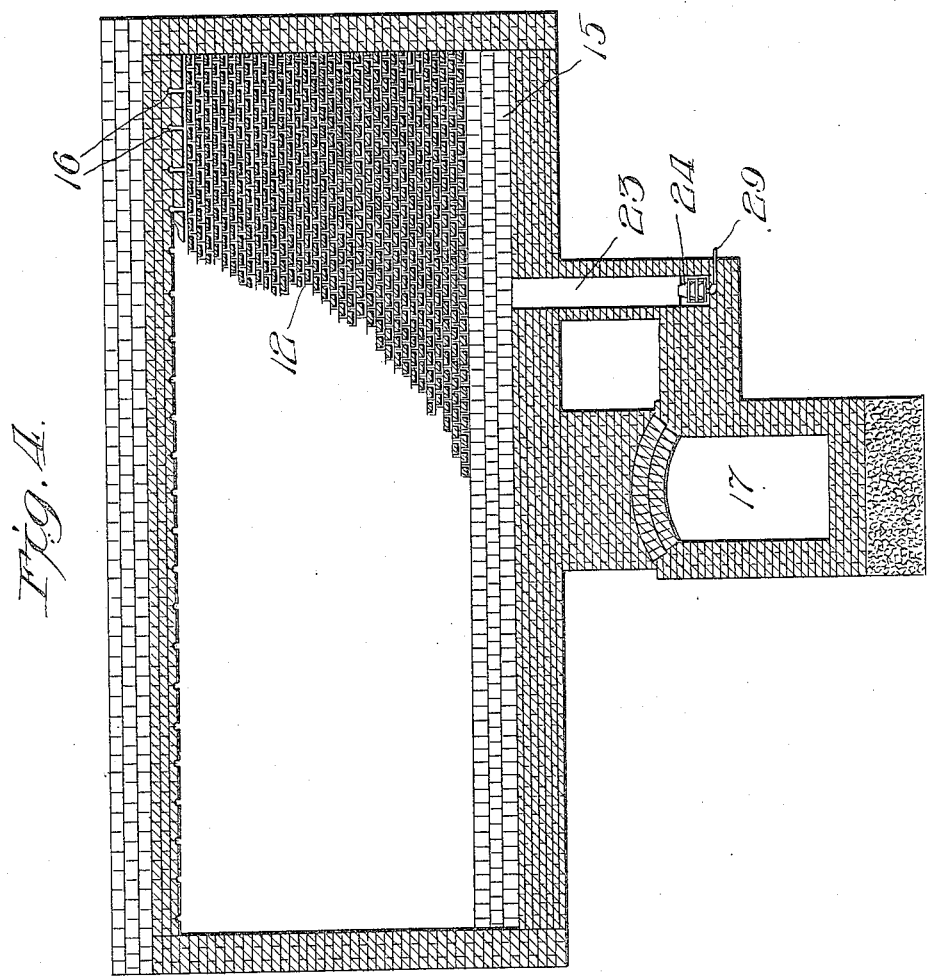

UNITED STATES PATENT OFFICE.

ARTHUR ROBERTS, OF EVANSTON, ILLINOIS.

METHOD OF PREHEATING.

1,304,908.

Specification of Letters Patent. Patented May 27, 1919.

Application filed September 15, 1916, Serial No. 120,349. Renewed October 23, 1918. Serial No. 259,406.

*To all whom it may concern:*

Be it known that I, ARTHUR ROBERTS, a citizen of the United States, residing at Evanston, county of Cook, and State of Illinois, have invented certain new and useful Improvements in Methods of Preheating, of which the following is a specification.

The present invention has to do with improvements in methods of heating the constituent gases which are used in combustion in coke ovens and the like. The method disclosed herein is used for the preheating of the said constituent gases for the purpose of economizing in fuel consumption, and also for the production of a higher temperature of combustion, and for giving a better control of the combustion. The method of preheating herein disclosed I shall term the reflex method, and it involves the preheating of the gases by directly mixing with them a portion of the hot products of combustion or spent gas. Certain features of the method herein disclosed are also disclosed in my co-pending application for Letters Patent of the United States on improvements in reflex coke ovens, Serial No. 105,131, which was filed June 22, 1916.

In this specification and in the drawings I shall disclose my method of preheating as used in the preheating of the air to be used in the combustion, and ordinarily the principles herein disclosed will be used for the preheating of the air. I wish it understood, however, that the said principles may also be used in some cases equally well for the preheating of the fuel gas, and I do not limit myself to the preheating of the air except as I may do so in the claims.

In previous methods of preheating coke ovens, it has been customary to preheat the air for combustion by either the regenerating or recuperating principle. In the regenerating principle the spent gases are caused to traverse a suitably constructed heat absorbing structure for the desired length of time, so that said heat absorbing structure has its temperature raised by the absorption of waste heat. On the other half of the cycle, the fresh air for combustion is caused to traverse the structure so preheated, the said fresh air being thereby preheated by the abstraction of heat from the heat absorbing structure.

In the ovens operating on the recuperating principle, the incoming fresh air is caused to continuously traverse a suitable structure, the interior portion of which structure is maintained in hot condition by the transfer of heat by conduction. When using this principle, the fresh air and heating gases always traverse their respective passages, and the transfer of heat is effected by conduction from the hot gases through the separating partition to the fresh air.

The reflex principle to which the present invention relates embodies the idea of mixing hot gases with the fresh air or other constituent gas, so that a mixture is produced, including a proportion of oxygen or fuel gas depending upon the proportions in which the constituent gas and the heating gas are mixed. Furthermore, the temperature of the mixture will depend upon the relative temperatures of the constituent gas and the heating gas, and the proportions in which they are mixed, as well as their specific heats. By the use of this principle, any desired amount of preheating may be secured, and any desired richness or leanness of constituent gas in the mixture may be secured, or these factors may be varied from time to time according to the wishes of the operator, simply by varying the proportions of the mixture. In this way a very accurate and perfect control of operation may be secured, so that the operation of the burners and the temperature of the heating walls can be very nicely adjusted in an extremely simple manner.

The temperature of the spent gases coming from the heating walls is ordinarily very high, frequently approximating 2000° F. Consequently an extremely high degree of preheat may be secured depending upon the proportions in which this spent gas and the air or other constituent gas are mixed. Ordinarily, of course, only a portion of the total amount of the spent gases will be mixed with the incoming fresh air, the remaining portion of the said spent gases being allowed to pass to the flue or other point of discharge. Thus, the total amount of gas and air in the system will remain constant, the rate of delivery to the stack or other discharge mechanism eventually becoming equal to the rate of generation of spent gases depending upon the operation of the burners. Ordinarily, also, the spent gases used for the preheating will be taken directly from the heating walls or from connections coming directly from the heating walls and without the interposition of regenerators or the like, so that the said spent gases used for preheating will be at substantially the temperature at which they leave the heating walls.

While I have hereinbefore referred to the application of this reflex preheating principle as being applied to use in connection with coke ovens, and while I shall hereafter refer to the same and shall describe the same as being used in connection with coke ovens, still it will be understood that the principles of preheating herein disclosed may be used to equal advantage in many other structures than coke ovens, and it will be understood that I do not limit myself to the application of these principles in coke oven practice, except as I may do so in the claims.

Referring now to the drawings:

Fig. 3 is a vertical longitudinal section through the carbonizing chamber of one oven and through the spent gas tunnel and foundation, being a section taken on the lines 3—3 of Figs. 1 and 2, looking in the direction of the arrows in the said figures;

Figure 1:
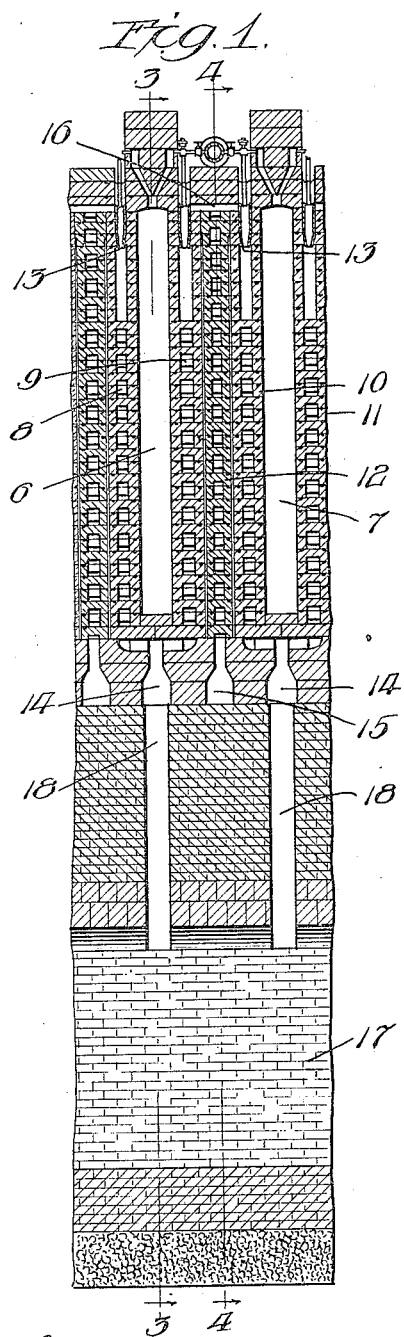
Figure 1 shows a vertical cross section through a pair of ovens with their heating walls, and through the spent gas tunnel and foundation, the said section being taken on line 1—1 of Fig. 3, looking in the direction of the arrows.
Figure 5:
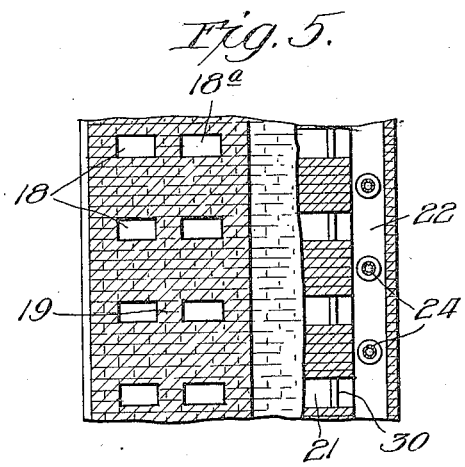
Figure 2:
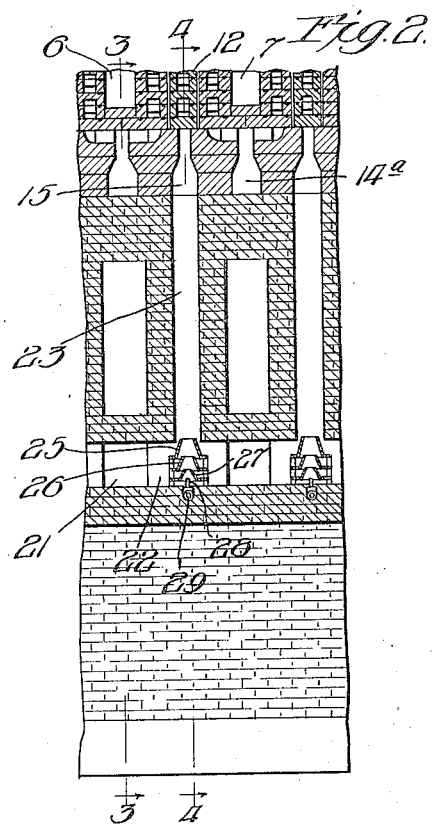
Fig. 2 shows another section similar to that shown in Fig. 1, with the exception that Fig. 2 is taken on line 2—2 of Fig. 3, looking in the direction of the arrows.

Fig. 4 is a longitudinal cross section similar to that of Fig. 3, with the exception that it is taken on the line 4—4 of Figs. 1 and 2, looking in the direction of the arrows, being a section through the reflex mechanism and through the recuperating walls when the same are to be used; and Fig. 5 is a horizontal section taken on the line 5—5 of Fig. 3 looking in the direction of the arrows.

In the particular construction illustrated in the drawings, I have shown the features of my invention as being embodied within a bench of coke ovens, wherein the heating walls are constructed according to the principles disclosed in Letters Patent of the United States No. 1132685, issued to me March 23, 1915. That is to say, I have shown the features of this invention as being applied to a bench of coke ovens in which the heating walls are built up from notched blocks so arranged as to provide a mesh work of impingement passages within each heating wall. It will be understood, however, that the features of the present invention are in no wise limited to use in connection with heating walls so constructed.

I have also shown the features of the present invention as being embodied within a bench of coke ovens, wherein the air which has been heated according to the reflex principle, is afterward transferred upwardly to the burners through recuperating walls, whose function is, among other things, to maintain the temperature of the said air at the desired high point until the burners are reached. Such a construction is shown, for example, in my copending application for Letters Patent of the United States on improvements in recuperative coke ovens, Serial No. 875,503, filed December 4, 1914, renewed May 8, 1916, as Serial No. 96250 and which issued into Letters Patent of the United States, No. 1,193,066, on August 1, 1916. I desire to state, however, that the features of the present invention are in no wise limited to use in connection with recuperating walls between the heating walls of the consecutive ovens, inasmuch as any suitable form of flue or passage way may be used for transferring the air or other constituent gas heated according to the reflex principle of the present invention, to the burners.

Bearing the foregoing facts in mind, in Figs. 1 and 2 I have shown a fragmentary portion of a bench of ovens, including the carbonizing chambers 6 and 7. The chamber 6 has the heating walls 8 and 9, and the chamber 7 has the heating walls 10 and 11. Between the heating walls 9 and 10 is the recuperating wall previously referred to. Each of the heating walls is shown as being built up from a series of notched blocks. The heating gases are delivered to each heating wall by a series of burners 13, and the spent gases from the heating walls of each oven are collected eventually in a sole passage 14 lying beneath the sole of the oven. Each of the recuperating walls 12 is also shown as being built up from a series of notched blocks. The fresh air for the said recuperating wall is delivered to the said wall by an air channel 15 extending along its lower portion, and the said fresh air is delivered from the recuperating wall to the burners previously described by means of the connections 16 at the upper end of the structure. It, therefore, appears that the recuperating walls serve chiefly as a convenient structure for transferring the air upwardly from the lower portion of the bench to the burners which are at the upper portion of the bench.

The tunnel 17 extends lengthwise of the bench, collecting the spent gases and delivering them to the stack, fan, or other structure as desired. Referring to Figs. 3 and 4, it will be quite evident that the expansion of the heating walls with their sole passages 14 is lengthwise of the oven—that is, across the width of the bench. Consequently the end portions of the said walls are subjected to the maximum amount of movement during expansion and contraction, whereas the central portions of the walls remain substantially stationary at all times. Inasmuch as the tunnel 17 also remains stationary, being a fixed portion of the foundation, it will appear that it is desirable to effect the connections from the sole passages 14 to the said tunnel in such a manner that the said connections will be taken from the sole passages at the point where they have the minimum amount of movement during expansion and contraction. I have, therefore, illustrated the tunnel 17 as lying beneath the central portion of the bench of ovens, and I have shown the downwardly extending connections 18 from the sole passages 14 to the said tunnel as being effected at the central portions of the sole passages.

A partition 19 conveniently separates each connection 18 into the two parts numbered 18 and 18$^a$, and the said partition is conveniently extended upwardly far enough to divide the sole passage into two parts numbered 14 and 14$^a$. The dampers 20 and 20$^a$ work in the connections 18 and 18$^a$ and serve to regulate the draft on each of said connections.

It will be quite evident that with the arrangement thus far described, any expansion and contraction in the heating walls will take place at points other than the point of connection from the sole passages to the spent gas tunnel, and consequently the said connections will not be in any manner injured or disrupted from such expansion and contraction.

Referring particularly to Fig. 3, there will be observed a sidewise connection 21, the inner end of which is connected into the upper portion of the tunnel 17. This sidewise connection 21, in turn, leads to a short horizontal connection 22, which, in turn, communicates with a vertical riser 23, the upper end of which connects to the corresponding air channel 15. Consequently, there is thus effected a direct connection from the spent gas tunnel to each air channel. Located at a convenient point in said connection is an induction device 24, the function of which is to discharge fresh air into the connection 23 in such a manner that the said fresh air will be carried upwardly into the air channel. At the same time the fresh air so introduced through the induction device will serve to carry with it by an injector action the desired amount of spent gas from the tunnel 17.

A convenient form of induction device is that shown in Figs. 2 and 3, wherein the said device is seen to comprise a series of separated hoods 25, 26 and 27, in conjunction with an air jet 28. The air jet receives its air under compression from a pipe 29. Each of these induction devices is conveniently located at the lower end of the corresponding riser 23, so that the air will be thrown directly up into said riser, mixing as it rises with the spent gas which is drawn through the connection 22. Therefore, when the mixture finally reaches the air channel 15, it will be thoroughly mixed, and will have a temperature depending upon the relative proportions of air and spent gas, the relative initial temperatures of these constituents, and their specific heats.

As a convenient form of construction, the several connections 22 may be joined together, so that they constitute in effect a continuous passage extending lengthwise of the bench of ovens lying parallel to the tunnel 17. Consequently, there may be a free interchange of spent gas through the said connection, thus tending to equalize the operation at all points within the bench. If desired, a damper 30 may be mounted in each of the connections 21 or at any other suitable point or points for the purpose of controlling or regulating the flow of spent gas to the induction devices.

In many cases it may be desired to use a given coke oven construction with different kinds of gas for heating the walls. For example, the same oven may be used either on producer gas or on coke oven gas, or other gas of high calorific value. When using the oven on the poorer gases, such as producer gas, it is necessary to burn a much larger volume of gas than is necessary when running the oven on richer gases such as coke oven gas. Therefore, in the former case, the passages in the heating walls must handle a relatively large volume of gas, and said passages should be of sufficient size to handle the largest volume of gas which will be necessary for the proper heating of the walls. If this same oven structure should be heated by richer gases, such as coke oven gas, a very much smaller volume of products of combustion gas will be passed through the passages of the heating walls. Consequently, in many cases the said passages will not be fully occupied, and as a result the heating gases may not distribute themselves uniformly throughout all of the passages. Furthermore, by the use of the notched block construction of heating wall, such as is disclosed in my Letters Patent of the United States, No. 1,132,685, a very perfect heating effect is secured, so that the desired amount of heat may be taken into the heating walls with a smaller consumption of gas than would otherwise be possible.

By the introduction of spent gas into the heating wall, the total volume of products of combustion traveling through the passages will be increased correspondingly, so that the heating gases will be compelled to distribute themselves into all of the heating passages, thus preventing any concentration of heating gases at one portion of the heating wall in greater amount than at another portion thereof. This is a considerable advantage for it gives the operator the opportunity to completely fill all of the passages of the heating walls with products of combustion, so as to insure a uniform distribution of the heating effect throughout all portions of the wall, regardless of the volume of the heating gases being generated by combustion.

It will be observed, in the particular arrangement illustrated in the drawings of this case, that the spent gas is delivered in the heating wall through the burners, which burners also deliver the air and fuel gas. In many cases, however, the spent gas will be delivered into the wall otherwise than through the burner passages, and, therefore, I do not limit myself to the introduction of the spent gas through the burner passages except as I may do so in the claims.

While it is true that I have shown and described my improved method of preheating as being applied particularly to the preheating of the air for combustion, still it will be understood that I contemplate equally the preheating of any of the constituent gases to be used in the combustion, when said preheating is accomplished by mixing therewith hot spent gas, and I contemplate as being within the scope of my invention the introduction or return of spent gases to the heating walls, whether the said spent gases be returned through the burners or otherwise.

Also, while I have herein shown and described only a single construction of mechanism for carrying into effect the method of my present invention, still it will be understood that I do not limit myself, in the practice of the said method, to this or any other construction of mechanism, except as I may do so in the claims.

I claim:

1. The method of preheating one of the constituent gases for the burners of a coke oven which consists in intimately mixing with said constituent gas, a portion of the hot spent gas coming directly from a heating wall of the coke oven, without the interposition of regenerators or the like, and substantially at the temperature at which the said spent gas leaves the heating wall, to thereby insure a maximum amount of preheating by use of a minimum amount of spent gas.

2. The method of preheating one of the constituent gases for the burners of a coke oven which consists in intimately mixing with said constituent gas, a portion of the hot spent gas coming directly from a heating wall of the oven, substantially at the temperature at which the said spent gas leaves the heating wall, to thereby insure a maximum amount of preheating by use of a minimum amount of spent gas.

3. The method of preheating one of the constituent gases for the burners of a coke oven which consists in forming a mixture of said constituent gas and a portion of the hot spent gas from the heating walls of the oven at substantially the temperature at which the said spent gas leaves the heating walls, to thereby insure a maximum amount of preheating with a minimum amount of spent gas.

4. The method of preheating one of the constituent gases for the burners of a coke oven which consists in forming a mixture of spent gas coming from a heating wall of the oven and the said constituent gas, without interposition of regenerators or the like.

5. The method of preheating one of the constituent gases for the burners of a coke oven which consists in forming a mixture of spent gas at substantially the temperature at which it leaves the heating wall, and the said constituent gas.

6. The method of conserving waste heat contained in the spent gases coming from the heating walls of a coke oven which consists in mixing the said spent gas with one of the constituent gases for the burners at substantially the temperature at which the said spent gas leaves the heating walls, and delivering the said mixture to the burners.

7. The method of recovering waste heat contained in the spent gases coming from a coke oven which consists in mixing the said spent gases at substantially the temperature at which they leave the coke oven, with one of the constituent gases for the burners, and delivering the said mixture to the burners.

8. The method of recovering waste heat contained in the spent gases coming from a coke oven which consists in delivering to the burners a portion of the said spent gases with substantially the full number of heat units contained in the said portion as the said portion left the coke oven.

9. The method of recovering waste heat contained in the spent gases coming from a heating structure which consists in delivering to the point of commencement of combustion spent gases previously generated and with substantially the full number of heat units contained in said spent gases as they leave the said heating structure.

10. The method of recovering waste heat contained in the spent gases coming from a coke oven which consists in delivering to the heating walls a portion of the spent gas with substantially the full number of heat units contained in the said portion as the said portion left the coke oven.

11. The method of conserving waste heat contained in the spent gases coming from the heating walls of a coke oven which consists in delivering to the heating walls a portion of the spent gases with substantially the full number of heat units contained by said spent gases as they leave the heating walls.

12. The method of insuring a uniform distribution of gases throughout the passages of a heating wall of a coke oven, which consists in introducing into the passages of the said heating wall spent gases in sufficient quantity to insure, in addition to the freshly generated products of combustion, a sufficient total volume of gas to insure a uniform distribution throughout the heating passages.

ARTHUR ROBERTS.

Witnesses:
THOMAS A. BANNING, Jr.,
FRANCES M. FROST.